(12) United States Patent
Meller et al.

(10) Patent No.: US 7,815,195 B2
(45) Date of Patent: Oct. 19, 2010

(54) SEALING RING AND SEALING RING ARRANGEMENT

(75) Inventors: Dieter Meller, Alfter (DE); Renate Mutschenich, Bergisch Gladbach (DE)

(73) Assignee: GAPI Technische Produkte GmbH, Rosrath (DE)

( * ) Notice: Subject to any disclaimer, the term of this patent is extended or adjusted under 35 U.S.C. 154(b) by 66 days.

(21) Appl. No.: 10/801,095

(22) Filed: Mar. 15, 2004

(65) Prior Publication Data

US 2006/0151959 A1 Jul. 13, 2006

(30) Foreign Application Priority Data

Mar. 14, 2003 (DE) ................. 103 11 155

(51) Int. Cl.
*F16J 15/00* (2006.01)
*F16J 9/00* (2006.01)

(52) U.S. Cl. ..................... 277/500; 277/447
(58) Field of Classification Search ............... 277/449, 277/452, 496–499, 529, 531, 587
See application file for complete search history.

(56) References Cited

U.S. PATENT DOCUMENTS

| | | | | |
|---|---|---|---|---|
| 1,271,077 A | * | 7/1918 | Probasco | 277/499 |
| 1,475,783 A | * | 11/1923 | Behnke | 277/499 |
| 2,186,020 A | * | 1/1940 | Hall | 277/453 |
| 2,360,731 A | * | 10/1944 | Smith | 277/453 |
| 2,970,871 A | * | 2/1961 | Flick | 92/244 |
| 3,104,594 A | * | 9/1963 | Reiners | 92/227 |
| 3,377,076 A | * | 4/1968 | Burnett | 277/582 |
| 3,455,566 A | * | 7/1969 | Hull et al. | 277/582 |
| 3,554,564 A | * | 1/1971 | Lassanske | 277/452 |
| 3,554,568 A | * | 1/1971 | Heid, Jr. | 277/452 |
| 3,727,927 A | * | 4/1973 | Packard | 277/434 |
| 3,751,784 A | * | 8/1973 | Packard | 29/888.01 |
| 3,826,508 A | * | 7/1974 | Packard | 277/466 |
| 3,895,815 A | * | 7/1975 | Panigati | 277/448 |
| 3,926,166 A | * | 12/1975 | Packard | 123/193.6 |
| 3,926,444 A | * | 12/1975 | Gripe et al. | 277/448 |
| 4,256,314 A | * | 3/1981 | Berglund et al. | 277/587 |

(Continued)

FOREIGN PATENT DOCUMENTS

DE    43 41 386 A1    6/1995

(Continued)

*Primary Examiner*—Thomas B Will
*Assistant Examiner*—Gilbert Y Lee
(74) *Attorney, Agent, or Firm*—Grossman Tucker Perreault & Pfleger, PLLC

(57) ABSTRACT

The invention relates to a sealing ring for sealing two components moving relative to each other, particularly a rotary shaft seal or piston ring, with a radially internal or external sealing surface that can be brought into contact with one of the components to form a seal against a fluid medium. On one side of the sealing surface the sealing ring displays a pressurizing surface to be pressurized by the fluid medium and, on the opposite side, a supporting surface to the side of the sealing surface for positioning against a groove flank of a component accommodating the sealing ring. The pressurizing surface and/or the supporting surface are inclined relative to the sealing surface and enclose an angle of less than 90° towards it, where the ring is capable of radial compression towards a radially internal sealing surface, or of expansion towards a radially external sealing surface.

21 Claims, 6 Drawing Sheets

U.S. PATENT DOCUMENTS

| | | | |
|---|---|---|---|
| 4,296,934 A | | 10/1981 | Atkin |
| 4,336,946 A | * | 6/1982 | Wheeler .................... 277/529 |
| 4,361,337 A | * | 11/1982 | Montes ...................... 277/499 |
| 4,422,533 A | * | 12/1983 | Price ......................... 188/71.4 |
| 4,449,721 A | * | 5/1984 | Tsuge ........................ 277/499 |
| 4,533,149 A | * | 8/1985 | Vater et al. ................. 277/499 |
| 4,618,154 A | * | 10/1986 | Freudenthal ............... 277/556 |
| 4,681,326 A | * | 7/1987 | Kubo ......................... 277/447 |
| 4,883,029 A | * | 11/1989 | Winston .................... 123/193.6 |
| 5,035,210 A | * | 7/1991 | Arai et al. ................. 123/193.6 |
| 5,671,928 A | * | 9/1997 | Lanyi et al. ................ 277/461 |
| 6,305,265 B1 | * | 10/2001 | Bingham et al. ............... 92/168 |
| 7,017,914 B1 | * | 3/2006 | Sytsma et al. ............... 277/452 |
| 7,191,875 B2 | * | 3/2007 | Kurimoto et al. ........... 188/72.4 |
| 2003/0102633 A1 | * | 6/2003 | Abiko ........................ 277/529 |

FOREIGN PATENT DOCUMENTS

| | | |
|---|---|---|
| DE | 199 53 384 C1 | 1/2001 |
| JP | 08028709 A | 2/1996 |
| WO | WO0184024 A1 * | 11/2001 |
| WO | WO03/044354 A1 | 5/2003 |

* cited by examiner

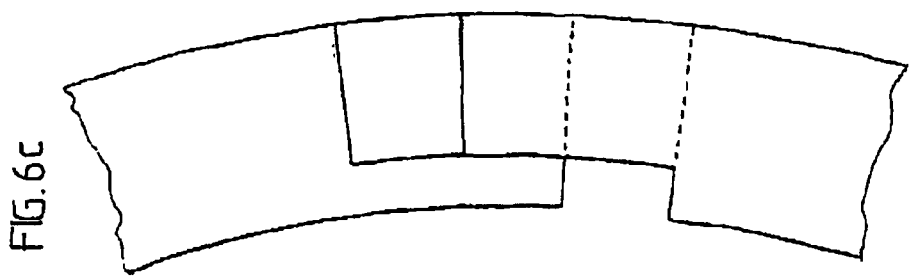
FIG. 6c
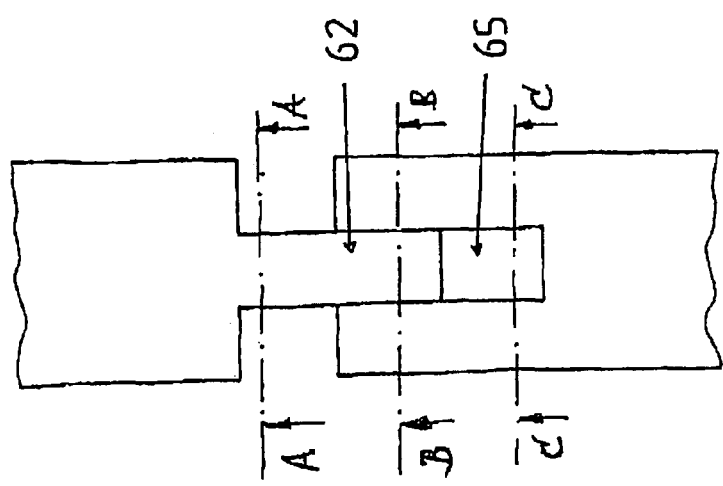
FIG. 6b
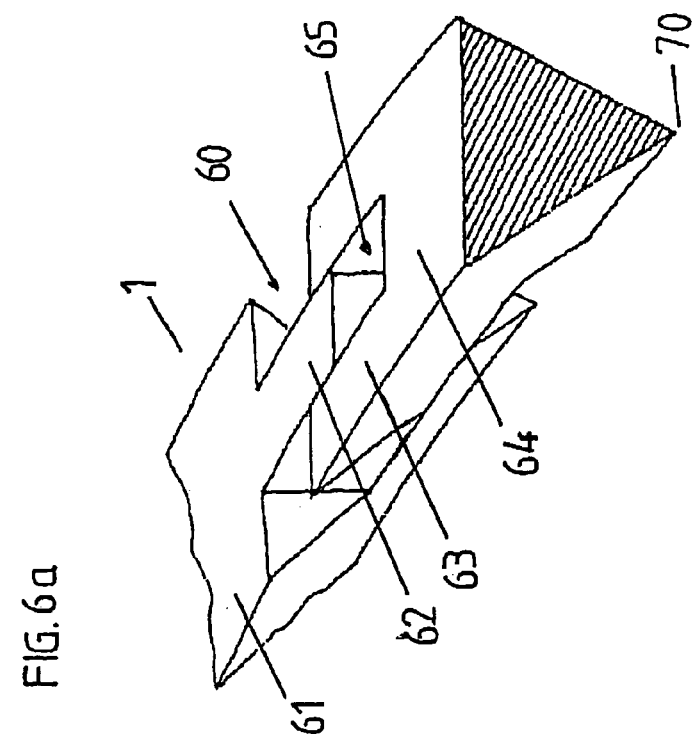
FIG. 6a
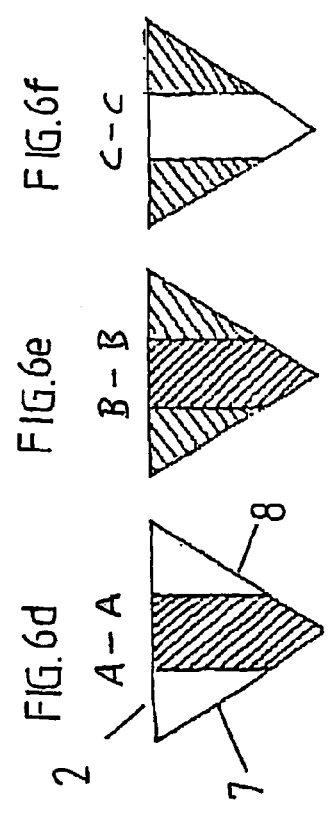
FIG. 6d A-A
FIG. 6e B-B
FIG. 6f C-C

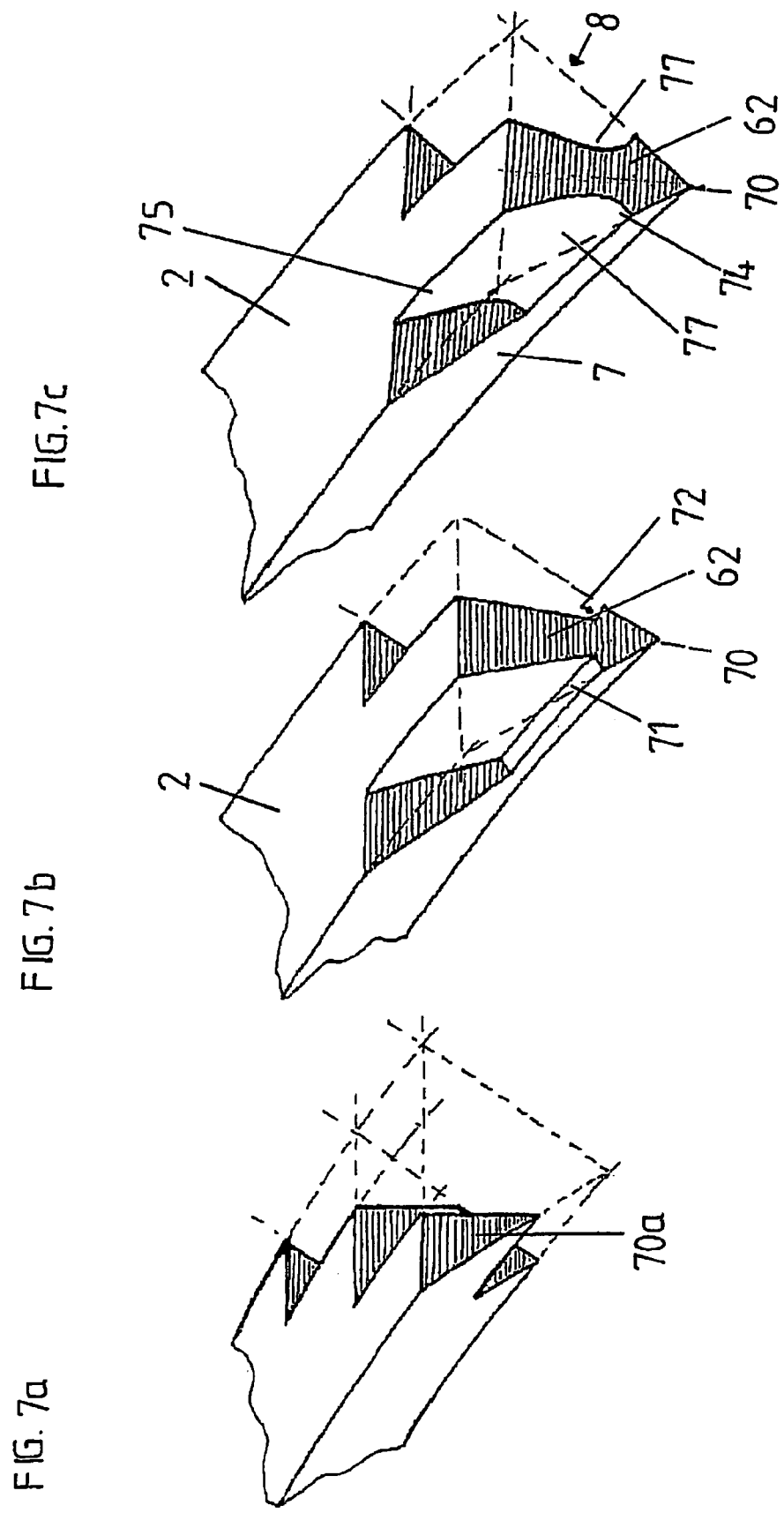

SEALING RING AND SEALING RING ARRANGEMENT

TECHNICAL FIELD

The invention relates to a sealing ring for sealing two components moving relative to each other, particularly as a rotary shaft seal or piston ring, with a radially internal or external sealing surface that can be brought into contact with one of the components to form a seal against a fluid medium, where, to the side of the sealing surface, the sealing ring displays a pressurizing surface to be pressurized by the fluid medium and, on the opposite side, a supporting surface to the side of the sealing surface for positioning against a groove flank of a component accommodating the sealing ring. The invention further relates to a sealing ring arrangement with a sealing ring according to the invention.

BACKGROUND

Sealing rings according to the invention are particularly used as rotary shaft seals to seal a shaft against a shaft guide, which can also constitute a housing, or as piston rings.

Both the sealing ring and the groove receiving it mostly display a rectangular cross-section in the fields of application mentioned. In this context, one of the groove flanks serves to support the sealing ring and is a sealing surface at the same time. In various fields of application, sealing against the component to be sealed, with which the sealing surface of the sealing ring can be brought into contact, is accomplished by external pretensioning of the sealing ring, or by pressurization of the sealing ring by the respective fluid medium, by which the sealing ring is pressed against the supporting groove and the component to be sealed.

The incorporation of rectangular groove cross-sections in the respective component is, however, relatively complex on the one hand, since it entails notch effects, which are to be avoided for many applications, if at all possible. Reducing the notch effects by means of suitable groove geometries is complex and, at the same time, either reduces the wall thickness of the sealing element, and thus its sealing effect, or results in deeper grooves. To achieve sufficient tightness, it is often even necessary to elaborately machine the groove flanks by grinding or other work steps. In the case of sealing rings with a rectangular cross-section, and thus corresponding grooves in the respective component, one particular disadvantage is that, owing to the respective available space, the sealing rings can often not be provided with the necessary heights or widths that would be required for sufficient tightness. This is particularly the case if the sealing rings are supportively, or also essentially exclusively, pressed against the sealing surfaces by the pressure of the fluid medium, since adequately dimensioned pressurizing surfaces on the sealing ring can then often not be provided to a sufficient extent owing to the prevailing available space. If sealing against non-wear-resistant materials is required, alternative measures have to be taken, such as lining the housing bore with steel sleeves.

Moreover, with conventional sealing ring arrangements, the often confined space available causes problems as regards adapting the design of the sealing ring arrangement to different requirements or fields of application, since changing the groove depths is occasionally subject to narrow limits.

SUMMARY

The object of the invention is to create a sealing ring and an associated sealing ring arrangement that guarantee great tightness with little manufacturing effort, and that can be adapted to different requirements profiles with a minimum of design-related effort.

According to the invention, the object is solved by a sealing ring on which the pressurizing surface or the supporting surface, or the pressurizing surface and the supporting surface, are inclined relative to the sealing surface of the sealing ring and enclose an angle of <90° towards it, where the sealing ring is capable of compression or expansion in the radial direction, depending on the arrangement of the sealing surface, especially under the intended pressure of the fluid medium during operation of the associated machine or device.

Due to the inclination of the pressurizing surface and/or the supporting surface towards the sealing surface of the sealing ring, the contact force of the supporting surface against an associated supporting flank of the groove accommodating the sealing ring, and the contact force of the sealing surface against the respective component to be sealed, can, with a given lateral pressure of the fluid medium on the pressurizing surface, be broken down by the corresponding geometrical resolution of forces, and the respective contact force against the corresponding surfaces of the sealing ring under certain operating conditions can be set by selecting different angles between the supporting surface or pressurizing surface and the sealing surface. At the same time, the contact forces, and also the resultant radial tension of the sealing ring, change in the required manner in response to changes in the pressure force of the fluid medium resulting from varying operating conditions of the respective machine. Furthermore, the pressure force of the fluid medium simultaneously centers the sealing ring in the respective receiving groove. Moreover, the associated groove flanks, particularly the supporting flank and the pressure-side flank of the groove, can also be manufactured more easily owing to their inclined position, thus avoiding the scores that often occur when withdrawing the respective tool during the manufacture of vertical groove flanks. Furthermore, the groove flanks are more easily accessible for subsequent machining operations, such as grinding and the like.

The supporting surface and/or the pressurizing surface are correspondingly inclined relative to the central longitudinal axis of the sealing ring. In this context, the sealing surface is partly or entirely arranged concentrically to the central longitudinal axis of the sealing ring, and is preferably designed as the surface of a cylinder that can be a radially external or internal boundary surface of the ring.

In particular, however, it is also possible, on account of the inclined position of the pressurizing surface and/or the supporting surface, to achieve a substantially larger contact area between the sealing ring and the shaft, and thus also a significantly longer flow path for leaks, compared to a corresponding rectangular ring with the same groove depth.

Depending on the field of application, the fluid medium can be a gas or a liquid, such as the pressurized oil or grease of an automatic transmission or another device, although the fluid medium can also be any other liquid, especially an aqueous phase, a gas or the like, particularly when using the sealing ring in reciprocating pumps.

The pressurizing surface and/or the supporting surface are preferably each designed at least partly, or completely, as the lateral surface of a truncated cone, this resulting in flat contact with the respective supporting flank or pressure-side flank of the groove at all times, also upon radial expansion/compression of the sealing ring. The respective lateral supporting and/or pressurizing surfaces each surround the sealing ring over its entire circumference.

For many fields of application, it has proven advantageous if the pressurizing surface and/or the supporting surface enclose an angle ALPHA of <80° to 75° and >approx. 20°, preferably an angle of approx. 30° to approx. 60°, particularly preferably an angle of approx. 45°, towards the sealing surface, meaning the angle enclosed with it in each case. Correspondingly, the pressurizing surface and/or the supporting surface can enclose an angle of 90°—ALPHA with the central longitudinal axis of the sealing ring. For many applications, the pressure force of the fluid medium is, as a result, capable—acting alone or supportively—of achieving a sufficient sealing effect by pressing the respective supporting or sealing surfaces against the associated component, and reliable centering of the sealing ring in the groove.

The areas of the pressurizing surface and/or the supporting surface of the sealing ring with the form of a truncated cone preferably follow on laterally, at least almost directly, from the sealing surface, thus determining the contact forces on the supporting flank and the corresponding component in the area of the sealing surface. Where appropriate, the above-mentioned surfaces each follow on from the sealing surface apart from a concavely curved, arc-shaped transitional area. If the respective areas with the form of a truncated cone extend virtually over the entire thickness of the sealing ring, the latter displays an essentially V-shaped cross-section. Where appropriate, the areas of the pressurizing surface and/or the supporting surface with the form of a truncated cone can also be a certain distance away from the sealing surface. In this context, the areas with the form of a truncated cone preferably each extend at least up to the area of the sealing ring projecting from the associated receiving groove.

If the pressurizing surface and the supporting surface enclose angles of the same magnitude with the sealing surface, which can particularly apply to the areas of said surfaces with the form of a truncated cone, the sealing ring can be inserted into the associated groove in the correct position in both possible arrangements. For certain requirements, however, it can also be particularly expedient to design the sealing ring to be "asymmetrical", such that the pressurizing surface and the supporting surface enclose different angles with the sealing surface. In this context, the angle between the supporting surface and the sealing surface can be greater or smaller than the angle between the pressurizing surface and the sealing surface.

Pursuant to a first advantageous embodiment, the sealing ring according to the invention displays an essentially triangular cross-section.

According to a further advantageous embodiment, the sealing ring displays a transitional area between the pressurizing surface and the respective supporting surface, where the supporting surface and/or the pressurizing surface each preferably follow on directly from the sealing surface and, independently hereof, are preferably designed as lateral surfaces of a truncated cone, said transitional area preferably being designed as the lateral surface of a truncated cone with a comparatively small angular inclination relative to the sealing surface, or as the surface of a cylinder. In this way, the sealing ring can display an essentially trapezoidal cross-section, where the respective surfaces can each transition into each other via rounded areas or via sharp-edges areas. This makes it possible to increase the width of the sealing ring and, as a result, the size of the sealing surface, in particular.

According to a further embodiment, which is advantageous for specific applications, the above-mentioned transitional area between the pressurizing surface and the supporting surface is design in arched fashion, e.g. with an arch in the form of a segment of a circle, where the arch particularly points away from the sealing surface as an outward arch, i.e. is oriented in the radially inward direction in the case of a radially external sealing surface, and in the radially outward direction in the case of a radially internal sealing surface. In this context, the receiving groove can also be designed with a correspondingly arched groove base, or transitions of the groove base to the adjacent groove flanks, this not only avoiding notch effects, but also permitting optimum utilization of the groove depth, thereby obtaining optimum sealing effects of the sealing surfaces of the sealing ring.

The sealing surface of the sealing ring is preferably the surface with the greatest width referred to the cross-sectional view of the sealing ring, i.e. the hypotenuse in the case of an essentially triangular sealing ring, or, in the case of an essentially trapezoidal sealing ring, preferably the base surface with the greater length in the cross-sectional view.

For special applications, it can be advantageous to give the pressurizing surface and/or the supporting surface of the sealing ring an appropriate profile, so that, in the case of a flowing fluid medium, for example, a certain deflection of the flow of the fluid medium, preferably in the manner of a blade effect, is achieved, and/or an increased sealing effect of the respective surface. The sealing properties of the sealing ring can be improved in this way, particularly if the sealing ring is not pretensioned and undergoes expansion/compression under the pressure exerted by the fluid medium.

To facilitate radial expansion or compression of the sealing ring by a fluid medium, the circumference of the sealing ring can be divided almost completely or throughout. This ensures that only slight forces oppose radial motion, even in the event of radial expansion/compression of the sealing ring. Almost complete division can be present if adjacent areas of the sealing ring are still connected to each other by a film hinge or the like. The dividing area can be designed in the manner of a "lock" or a labyrinth seal, to which end the sealing ring is provided with stepped incisions, which can display the form of a Z or a W, for example. The dividing area thus displays comparatively great tightness owing to the laterally overlapping areas of the sealing ring, which are located one behind the other in the direction in which the sealing ring is pressurized with fluid.

The sealing ring can consist of plastic, particularly a thermoplastic material, which can, for example, be processed by an injection molding process, or as powder in a direct molding process. This kind of choice of sealing ring material is particularly possible because, by adjusting the contact pressure of the sealing ring against the component with the sealing ring receiving groove, or against the corresponding component to be sealed, the contact forces of the sealing ring can be adjusted, and thus also the relative motion of the sealing ring in relation to the respective component. Thermoplastic materials of this kind can, in particular, be PAI, PAEK, PEEK, PI, PTFE or other suitable plastics. The sealing ring preferably does not consist of an elastomeric material.

The sealing ring preferably consists of a plastic material displaying elastic elongation of $\leq 75\%$ or $\leq 50\%$, preferably $\leq 30\%$, particularly preferably $\leq 20\%$, at room temperature. The elastic elongation under the specified conditions should, however, generally not be less than 2% or 5%. In particular, the plastic material can display an elongation at break of $\leq 75\%$ or $\leq 50\%$, preferably $\leq 30\%$, possibly $\leq 20\%$, at room temperature (determination according to ASTM or DIN standards, e.g. DIN 53504). It goes without saying that an elastic elongation or elongation at break of the material of >50% may be acceptable for certain applications. The elongation at break should, however, be >2% or >5% or >10%.

The object of the invention is furthermore a sealing arrangement, with a sealing ring according to the invention and a component receiving the sealing ring in a groove without undercut, where the groove displays a supporting flank and a pressure-side flank, these being respectively located opposite the supporting surface and the pressurizing surface of the sealing ring. In this context, the sealing ring supporting surface can be brought into contact with the supporting flank in sealing fashion over part of its surface, and particularly over its whole surface, preferably around the entire circumference.

To achieve not only advantages in terms of production engineering, but particularly also a high sealing effect even when only little design height is available, the pressure-side flank and/or the supporting flank of the groove enclose an angle of <90° with the sealing surface of the sealing ring or the envelope of the open groove flank, where the enclosed angle can be <80° to 75° and >approx. 20°, preferably approx. 30° to approx. 60°, particularly preferably approx. 45°. Furthermore, a gap is provided, at least between the pressurizing surface of the sealing ring and the pressure-side groove flank, into which a fluid medium, such as a gas or a liquid, to be provided on the pressure side of the sealing ring can flow, pressing the sealing ring against the supporting flank or the corresponding component. The pressure force of the sealing ring on the respective component can, where appropriate, be supported by pretensioning of the sealing ring, or it can, at least under certain conditions of the respective machine, be generated predominantly or exclusively by the pressure force of the fluid medium. In this context, the intended conditions of the machine are, for example, the conditions of idling, low-load or normal-load operation. The sealing ring thus acts as a dynamically stressed component and develops its intended sealing effect at least partially, or virtually completely, as a result of the pressure force of the fluid medium, at which the sealing ring can be expanded or compressed towards its sealing surface.

The gap between the sealing ring and the pressure-side flank can extend merely over the lateral pressurizing surface, which can, for example, be designed as the lateral surface of a truncated cone, although the gap can also extend farther, into the transitional area between the supporting surface and the pressurizing surface of the sealing ring, or over the entire transitional area, such that the sealing surface is additionally pressed against the component to be sealed by the pressure of the fluid medium.

The sealing ring is preferably accommodated almost entirely in the respective groove, to which end it can preferably protrude by less than one-third of its radial thickness, e.g. less than 10% or less than 5%, from the groove at the height of the supporting flank and/or the pressure-side flank. The protruding area of the sealing ring must be adapted to the respective distance between the components to be moved relative to each other, such as the clearance to be provided between piston and piston-pin bush, shaft and shaft guide or the like, for operation of the corresponding machine as intended. The projecting area can, for example, be in the region of 1 mm or less, e.g. in the region of ¼ mm or ¹⁄₁₀ mm.

The axial extension of the transitional area between the supporting surface and the pressurizing surface of the sealing ring can be less than 80%, 50%, or less than 10% of the axial extension of the sealing ring or the width of the sealing surface, or more than 10%, 20%, or more than 50% of the axial extension of the sealing ring or the width of the sealing surface.

The cross-sectional contour of the supporting flank of the groove preferably corresponds to the cross-sectional contour of the corresponding supporting surface of the sealing ring, such that the supporting surface and the supporting flank can be brought into contact with each other over part or the whole of their surface in the respective sealing arrangement, particularly at maximum expansion or compression of the sealing ring in the direction of the sealing surface, particularly in all states of expansion or compression. The supporting surface of the sealing ring can preferably be brought into contact with the supporting flank of the groove without any gap.

The pressure-side gap furthermore preferably displays a constant gap width, which can, for example, be in the region of 1 mm or less, less than 0.5 mm, or less than ¹⁄₁₀ mm. It goes without saying that the gap width must be selected suitably in accordance with the respective fluid medium, the respective operating pressure and the sealing ring diameter.

The gap width is preferably less than/equal to the radial projection of the sealing ring from the groove on the side of the supporting flank and/or the pressure-side flank, which can, in this context, preferably be less than 20% or 10%, where appropriate also less than 5%, of the radial thickness of the sealing ring.

The groove base, or the transitional areas of the groove base, is or are preferably of rounded or arched design towards one or both of the adjacent groove flanks, this avoiding sharp-edged transitions.

The arrangement according to the invention is preferably envisaged for sealing a shaft against a shaft guide, where the sealing ring can contact the component opposite the groove with or without pretension. As a result of adjusting the contact pressure against the component to be sealed by means of suitable inclination of the pressurizing surface, the sealing ring can be fixed in position relative to a shaft guide, which can be designed as a housing in particular, largely or completely avoiding rotary motion of the sealing ring relative to the shaft guide owing to the respective contact force. This makes it possible to design the sealing ring as a plastic component and/or to manufacture the housing from a light metal material, particularly an aluminum material, which displays only little wear resistance.

One particularly advantageous field of application for the sealing arrangement according to the invention is its use in automatic transmissions for sealing at least one oil passage against transmission components, particularly hollow shafts.

Another particularly advantageous field of application is that as a piston ring in a piston engine, which can particularly be a combustion engine, a steam engine or a reciprocating pump. In this context, the sealing ring can be provided as a piston ring, particularly also at a distance from the piston head, where the depth of the pressure-side groove flank can correspond to the depth of the supporting flank. In this context, at least one further piston ring, which can be designed according to the invention or of a different design, can also be located between the piston ring according to the invention and the piston head.

In the sealing arrangement according to the invention, with the sealing ring as a piston ring, the contact pressure of the sealing ring on the cylinder wall is thus controlled by the pressure in the cylinder chamber. This makes it possible to dispense with permanent external pretensioning of the piston ring, or the provision of supporting springs or further piston rings that press the piston ring according to the invention against a groove flank or the cylinder, although these can be provided for certain applications.

It goes without saying that, given a sufficiently short piston stroke, a sealing ring according to the invention can, where appropriate, also be located in the respective cylinder accommodating the piston.

It goes without saying that the provision of a gap between the sealing ring and the component accommodating the sealing ring in a groove, into which a fluid medium can flow for pressurizing the sealing ring, is a particularly preferred embodiment of a sealing arrangement, but the sealing ring according to the invention can also be used in sealing arrangements without a gap of this kind for certain applications.

DESCRIPTION OF THE DRAWINGS

An example of the invention is described below and explained on the basis of the drawings. The drawings show the following.

DETAILED DESCRIPTION

Figure 1A:
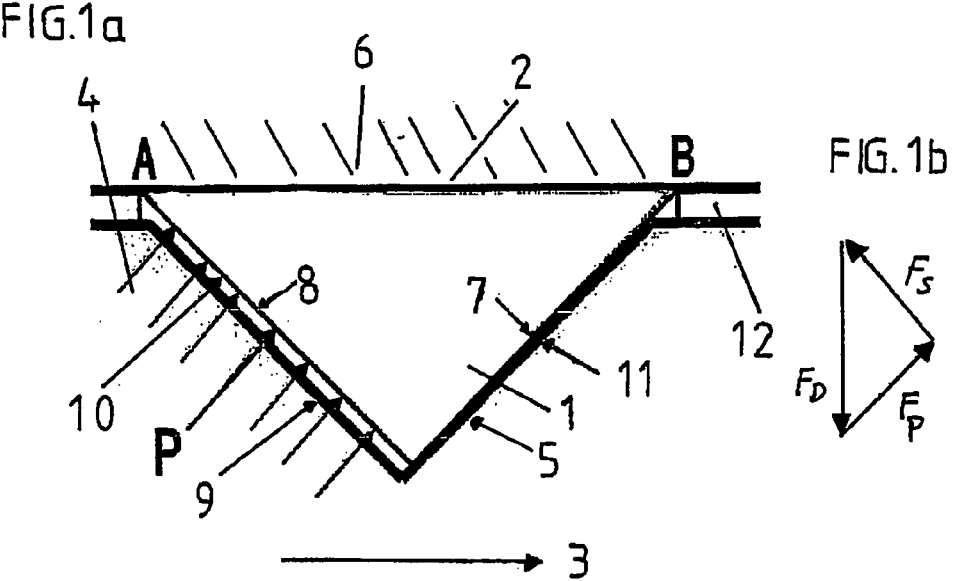
FIG. 1a A schematic cross-sectional representation of a sealing ring according to the invention and a first component with a receiving groove for the sealing ring, FIG. 2a-c Schematic representations of alternative embodiments of sealing rings according to the invention, FIG. 3a-c Schematic representations of sealing rings according to the invention in receiving grooves of a first component, in sealing contact with a second component, FIG. 4 Schematic representations of a sealing ring according to the invention in a shaft seal, where the receiving groove of the sealing ring is located in the shaft (FIG. 4a) or the shaft guide (FIG. 4b), FIG. 5 A schematic representation of a sealing ring in a piston arrangement, FIG. 6a-f Schematic representations of the dividing area of a sealing ring according to the invention, designed as a labyrinth seal, FIG. 7a-c Schematic representations of the dividing area of sealing rings according to the invention.

Pursuant to FIG. 1a, sealing ring 1 according to the invention displays a radially external sealing surface 2, which, as the surface of a cylinder, is positioned with a surface normal perpendicular to the central longitudinal axis of the sealing ring, or the longitudinal axis or axis of displacement 3 of component 4, which receives the sealing ring in a groove 5. In this context, the full area of sealing surface 2 is in contact with component 6 to be sealed, where components 4 and 6 can be capable of rotary movement or axial displacement relative to each other. In this context, the thickness of the sealing ring is less than the axial extension or width of the sealing ring in direction 3, as a result of which the fluid medium can achieve a high sealing effect of the sealing ring.

Figure 1B:
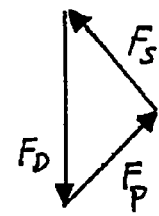

Located laterally to sealing surface 2, the sealing ring displays a supporting surface 7 and an opposite pressurizing surface 8, each of which is inclined relative to sealing surface 2 and encloses an angle of approx. 45° with it. The sealing ring is of symmetrical design in this context. Provided between pressurizing surface 8 and adjacent pressure-side groove flank 9 is a gap 10, into which a fluid medium, such as a gas or a liquid, can flow from the left-hand side in the drawing. Owing to the inclined pressurizing surface, the fluid medium exerts a pressure $F_P$ perpendicular to the pressurizing surface, which results in a radial sealing force $F_D$ of sealing surface 2 of component 6 on the sealing ring, and a supporting force $F_S$ of supporting flank 11 of the groove on the sealing ring. In this context, FIG. 1b shows the forces acting externally on the sealing ring in the form of a diagram of forces. As a result, the sealing ring is pressurized against both components 4 and 6 by the fluid medium, forming a seal. In this context, pressurizing surface 8 and supporting surface 7 are each designed as lateral surfaces of a truncated cone that laterally border the sealing ring over its entire radial thickness. Where appropriate, the sealing ring can also be slightly rounded in the area of radial boundary A and/or radial boundary B, or it can be provided with an axially projecting sealing lip.

The width of gap 12 existing between components 4 and 6, which move relative to each other, roughly corresponds to one-tenth of the thickness of the sealing ring, the width of gap 10 corresponding to roughly half the width of gap 12. It goes without saying that the gap widths can also be dimensioned differently, independently of each other. According to the practical example, gap 10 extends over the entire lateral border or radial extension of the sealing ring. In this context, supporting surface 7 of the sealing ring is in flat contact, more precisely full contact, with supporting flank 11 of the groove. In this context, both surfaces are in flat contact, more precisely full contact, with each other in installed position between components 4 and 6 in every possible expansion/compression condition of the sealing ring.

As a result of the described design of the sealing ring and the groove, not only can the groove be manufactured particularly simply in terms of production engineering, but the design of the sealing ring can also be adapted to widely differing requirements with little design-related effort by changing the inclination of the supporting surface and/or the pressurizing surface of the sealing ring and the associated groove flanks.

Figure 2A:
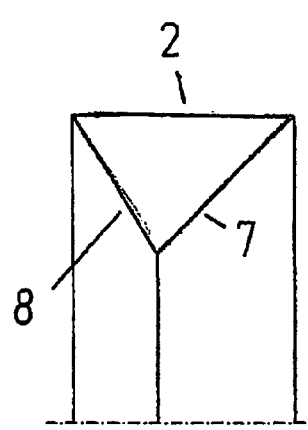

FIG. 2a shows a schematic representation of a sealing ring according to the invention, where pressurizing surface 8 and supporting surface 7 enclose different angles with sealing surface 2, in which context other angles can also be realized. In certain applications, supporting surface 7 can also be at a steeper angle to sealing surface 2 than pressurizing surface 8.

Figure 2B:
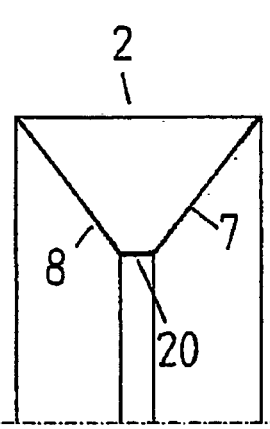
Figure 2C:
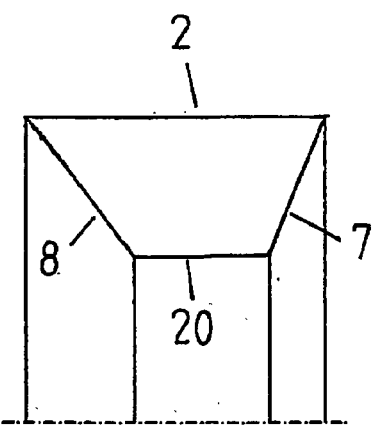

FIGS. 2b and 2c show sealing rings with transitional areas 20 between supporting surface 7 and pressurizing surface 8, which are here again designed as lateral surfaces of a truncated cone. Transitional areas 20 are designed as surfaces of a cylinder here, although they can, for example, also be designed as lateral surfaces of a truncated cone, which then preferably enclosed a much smaller angle with the sealing surface than lateral boundary surfaces 7, 8 of the sealing ring.

The transitional areas between supporting surface 7 and/or pressurizing surface 8 pursuant to FIGS. 1a and 2a, or between the lateral boundary surfaces and transitional area 20, can, as indicated by the broken line, also be arched where appropriate. The cross-sectional form of the groove in the area of the pressurizing surface, the supporting surface and/or the transitional area between them, preferably corresponds to the cross-sectional form of the corresponding seal, apart from a gap for the fluid medium, where appropriate.

Figure 3A:
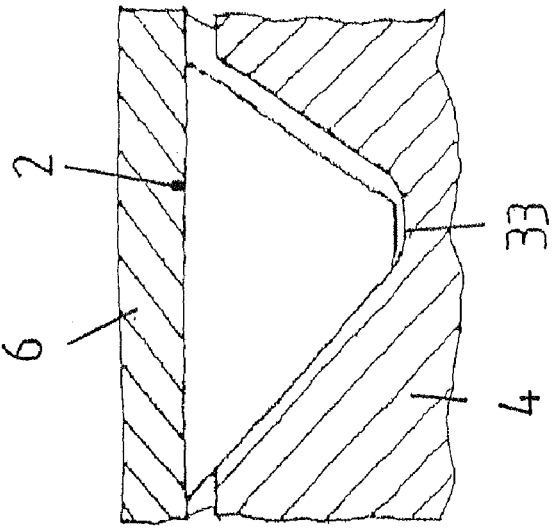

FIG. 3a shows a schematic representation of sealing ring 1 located between components 4 and 6, where the supporting surface and the pressurizing surface meet in area 30 of the sealing ring in sharp-edged manner, or with very slight rounding. Thus, gap 10 and, consequently, pressurizing surface 8 of the sealing ring extend over the height of the triangular cross-section of the sealing ring.

Figure 3B:
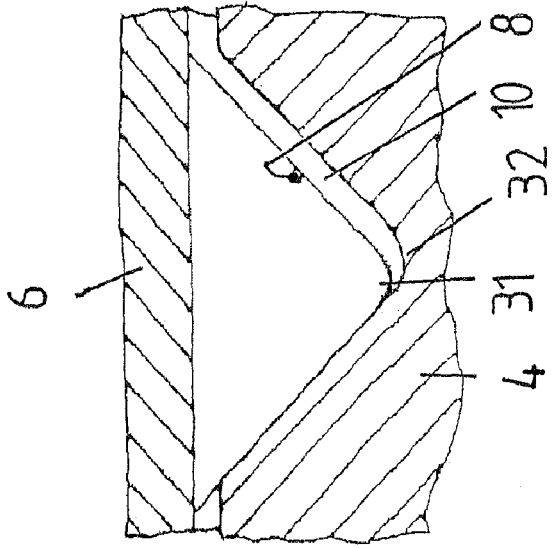

FIG. 3b shows a sealing ring with an arched transitional area 31, where gap 10 and, consequently, also pressurizing surface 8 also extend into rounded transitional area 31 of the sealing ring. Accordingly, groove 5 displays an arched groove base 32. In this context, gap 10 tapers towards groove base 32. As a result of the extension of gap 10, into which pressurized fluid medium can flow from the pressure side (on the right in FIG. 3), the sealing ring is additionally pressed radially outwards against component 6, forming a seal.

Figure 3C:
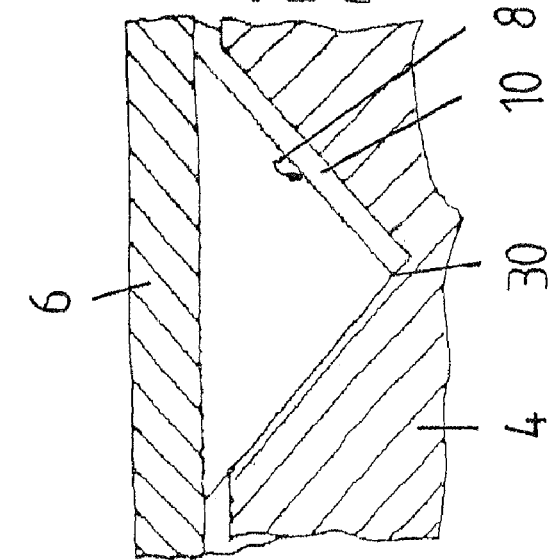

Pursuant to FIG. 3c, the sealing ring is of asymmetrical design, and pressurizing surface 8 is arranged more steeply to sealing surface 2 than supporting surface 7. Transitional area 33 between the supporting surface and the pressurizing surface of the sealing ring, which is located opposite sealing surface 2, is likewise designed as the surface of a cylinder, where gap 34 extends over the entire transitional area 33 of the sealing ring. It goes without saying that the gap width at the level of transitional area 33 can also be smaller than at the level of pressurizing surface 8, or negligible in comparison with it, in order merely to permit pressurization of supporting surface 7 and supporting flank 11 without skewing.

Figure 4A:
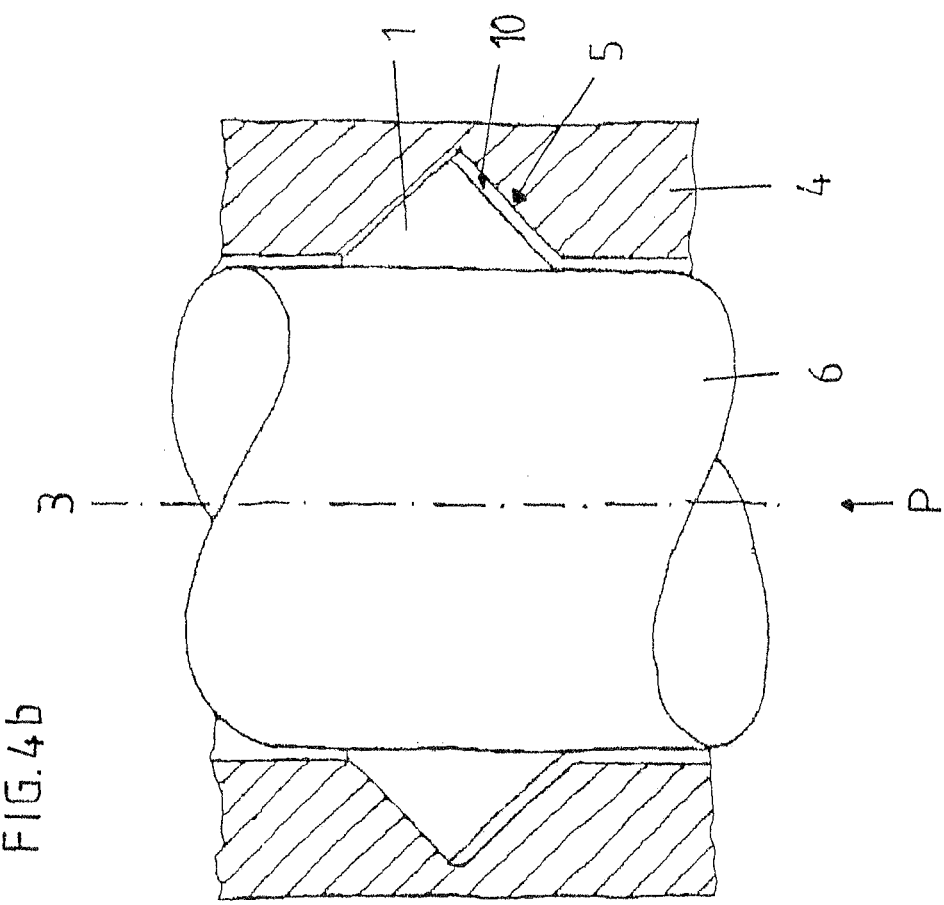
Figure 4B:
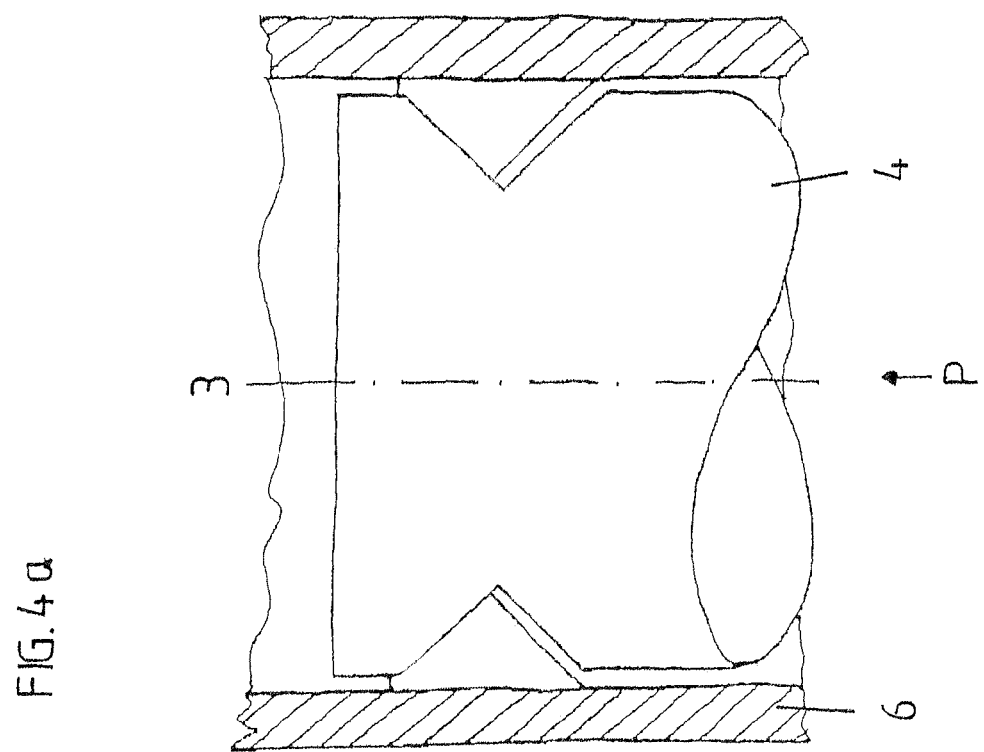

FIGS. 4a and 4b show sealing arrangements according to the invention where, pursuant to FIG. 4a, the component accommodating sealing ring 1 in groove 5 is designed as a shaft 4, and component 6 to be sealed is designed as a shaft guide. In this context, the shaft guide, which can constitute a housing, can also be a housing made of light metal, such as aluminum. Due to the fluid medium flowing into the gap, the sealing ring is pressed radially outwards and expanded slightly. The supporting surface of the sealing ring is arranged at such an angle to the pressure direction of the fluid, or to the longitudinal direction of the shaft, that the pressure force is sufficient to press the sealing surface of the sealing ring in sealing fashion against the shaft guide with relatively high force, such that, even if the shaft rotates, the sealing ring remains stationary, i.e. does not rotate, on the shaft housing due to static friction. Wear of the housing as a result of motion of the sealing ring relative to the housing is avoided in this way. Furthermore, even if the shaft rotates at high speed, pretensioning of the sealing ring can often be dispensed with because it is pressed against the sealing surface with sufficient force.

Where appropriate, the pressure conditions can thus be set by means of the angle of the supporting surface in such a way that the ring "runs" in the groove of the shaft.

FIG. 4b shows a sealing arrangement according to the invention, where sealing ring 1 is located in groove 5 of a component 4 designed as a shaft guide. As a result of fluid medium flowing into gap 10, sealing ring 1 is pressed radially inwards, undergoing slight compression, onto component 6 designed as a shaft. The shaft guide, or the housing accommodating sealing ring 1, can possibly again be made of light metal in this case. Again, the supporting surface of the sealing ring can be arranged at such an angle to the pressure direction of the fluid, or the longitudinal direction of the shaft, that the pressure force is sufficient to press the sealing surface against the shaft with sufficient force, where the sealing ring can remain stationary relative to the shaft or the shaft guide, where appropriate, or rotate relative to both components.

The shafts pursuant to FIGS. 4a and 4b can, where appropriate, perform rotary motion relative to the respective shaft guide. It goes without saying that, where appropriate, components 4 and 6 can also be designed as connecting rods mounted in corresponding guides.

Figure 5:
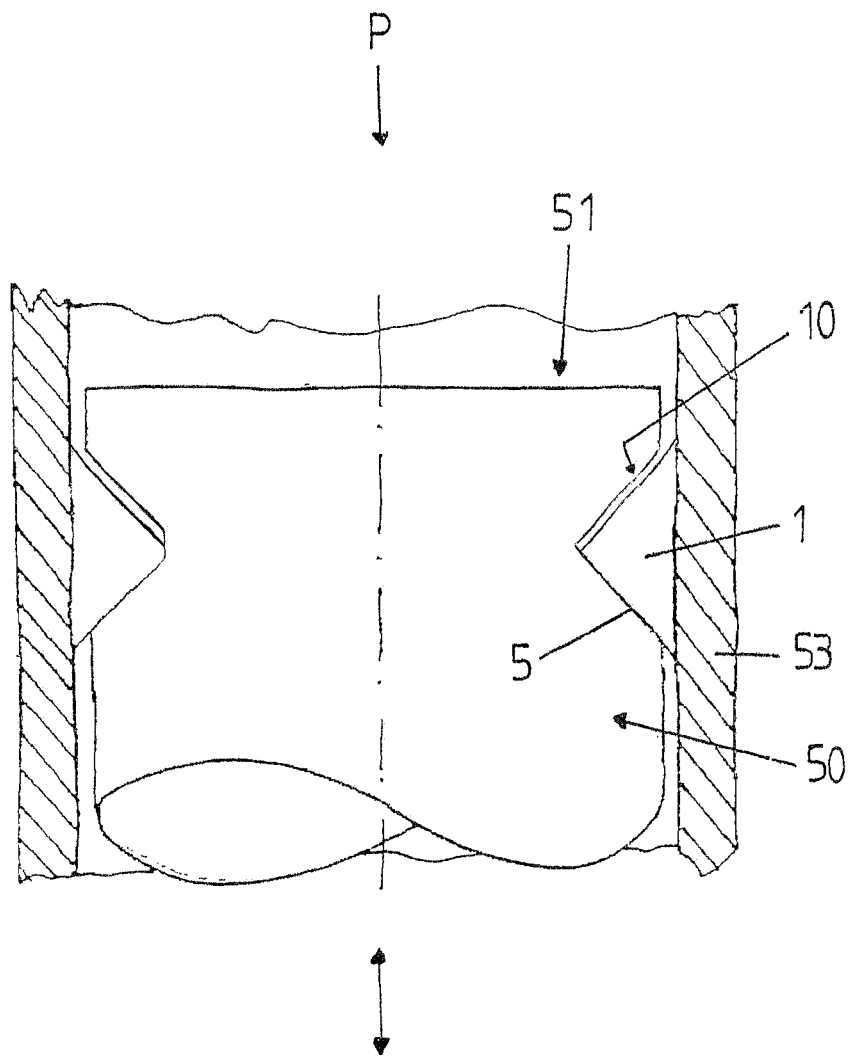

FIG. 5 shows a piston arrangement according to the invention, in which sealing ring 1 is located in a groove 5 of a piston 50, where groove 5 is located a distance away from piston head 51. Where appropriate, further sealing rings can also be located between sealing ring 1 according to the invention and the piston head. As a result of gas from pressure chamber 52 flowing into gap 10, which can be the combustion gas of a combustion engine, the steam of a steam engine, or a fluid to be conveyed by a reciprocating pump, such as a gas or a liquid, sealing ring 1 is pressed against piston cylinder 53, forming a seal.

It goes without saying that, in all the practical examples described, the sealing ring can contact the respective component to be sealed either without or with pretension, where the contact force can in each case be generated partly, predominantly or entirely by the fluid medium.

To facilitate expansion or compression of the sealing ring, it is preferably divided over its entire cross-section, as explained by way of example in FIGS. 6 and 7. Naturally, other designs are also possible for this purpose.

Pursuant to FIG. 6a, dividing area 60 of the sealing ring displays a first end 61 with a web 62, arranged in a central area, that engages a fork-like end 63 of opposite end area 64. The length of web 62 and receiving groove 65 is dimensioned such that they engage each other in every expanded or compressed position of the sealing ring in the respective sealing ring arrangement. FIGS. 6b and 6c show views of sealing surface 2 and of a lateral boundary surface 7, 8 of the sealing ring when the sealing ring is expanded. FIGS. 6d to 6f show sectional views of the sealing ring according to FIG. 6b. The W-shaped labyrinth seal is capable of achieving the most extensive possible tightness, while facilitating expansion or compression of the sealing ring.

FIGS. 7a to 7c show modifications of labyrinth seals or "locks" in the dividing area of the sealing ring. According to FIG. 7a, the labyrinth seal is designed in the manner of a double step with Z-shaped step arrangements. FIGS. 7b and 7c show variations of a "fork lock" pursuant to FIG. 6, where center web 62 extends up to back 70 of the sealing ring, opposite sealing surface 2. Furthermore, below one or both partial areas, which are parts of supporting surface 7 and pressurizing surface 8, the center web displays step-shaped shoulders 71, 72, which can be provided with inclined surfaces, where appropriate. This avoids sharp-edged areas or steps on the sealing ring, and damage to the sealing ring in the area of the edges. Furthermore, this avoids a kind of wedging of areas, such as fork-shaped areas 63 pursuant to FIG. 6a or areas of a first step 70a pursuant to FIG. 7a, which are supported in the direction of pressure by opposite areas of the other end of the sealing ring.

Pursuant to FIG. 7c, starting from supporting surface 7 and/or pressurizing surface 8 of the sealing ring, the areas of a center web or an internal step extend into the inside of the sealing ring with arc-shaped areas 74, 75. It goes without saying that the web or the fork areas of the other end of the sealing ring have a corresponding cross-sectional shape and corresponding contact surfaces. In this context, center web area 76 displays inward indentations 77 on both sides.

The step-shaped or arched areas can improve the "locking" of the sealing ring ends when pressurized, the arches simultaneously preventing skewing in the event of expansion/compression of the sealing ring.

LIST OF REFERENCE NUMBERS

1 Sealing ring
2 Sealing surface
3 Longitudinal axis/Axis of rotation
4 Component
5 Groove
6 Component
7 Supporting surface
8 Pressurizing surface
9 Pressure-side groove flank
10 Gap
11 Supporting flank
12 Gap
20 Transitional area 30, 31, 33 Transitional area
32 Groove base
34 Gap
50 Piston
51 Piston head
52 Pressure chamber
53 Cylinder
60 Dividing area
61 First end
62 Web
63 Fork
64 Second end
65 Groove
70 Back
70a Step
71, 72 Bevel
74, 75 Curved area
76 Center web
77 Arched indentation

What is claimed is:

1. A sealing arrangement consisting essentially of a sealing ring having a generally triangular or trapezoidal cross-section and two components moving relative to each other, said components having a first gap width therebetween, including a radially internal or external sealing surface that can be brought into flat area contact with at least one of said components to form a seal against a fluid medium, where, to one side of said sealing surface, said sealing ring displays a pressurizing surface to be pressurized by said fluid medium and, on the opposite side, a supporting surface for positioning against a supporting flank of the component accommodating the sealing ring,
   wherein one of said two components displays a groove without an undercut to receive said sealing ring, where said groove displays said supporting flank opposite said supporting surface of said sealing ring, and a pressure-side flank opposite said pressurizing surface of said sealing ring, where said sealing surface of said sealing ring projects from said groove in the radial direction, and wherein said sealing ring has a central longitudinal axis;
   wherein a second gap width is provided, at least between said pressurizing surface of the sealing ring and said pressure-side flank, into which said fluid medium to be provided on the pressure side of said sealing ring can flow, pressing said sealing ring in sealing fashion against said supporting flank of said groove and against one of said two components, and, by application of pressure by said fluid medium, said supporting surface of said sealing ring over the height and circumference of the sealing ring is brought into flat area contact with said supporting flank of said groove,
   wherein said supporting surface of said sealing ring as well as said supporting flank of said groove have an inclination angle of 30° to 60° towards said sealing surface,
   wherein said supporting surface is designed as a lateral surface of a truncated cone, resulting in flat contact with said supporting flank of said groove,
   wherein said second gap extends over the entire lateral extension of said sealing ring,
   wherein said sealing ring is divided almost completely or throughout in the radial direction at one point on its circumference, forming a weaker area,
   wherein said sealing ring is radially compressed outwards towards said radially internal sealing surface, or radially compressed inwards towards said radially external sealing surface,
   wherein said sealing surface is in flat area sealing contact with one of said two components to form a seal when said sealing ring is pressurized, and
   wherein said supporting surface of said sealing ring is in flat area contact with said supporting flank of said groove in any expansion or compression state of the sealing ring due to pressure changes of said fluid medium.

2. The sealing arrangement according to claim 1, characterized in that the area of said pressurizing surface or said supporting surface, or of said pressurizing surface and said supporting surface, with the form of a truncated cone follows on laterally, at least almost directly, from said sealing surface.

3. The sealing arrangement according to claim 1, characterized in that a surface is located between said pressurizing surface and said supporting surface, opposite to said sealing surface, which is a lateral surface of a truncated cone, or a surface of a cylinder, or a concavely arched surface forming a transitional area.

4. The sealing arrangement according to claim 1, characterized in that the radial thickness of said sealing ring is less than/equal to the extension of said sealing surface in the axial direction of said sealing ring.

5. The sealing arrangement according to claim 1, characterized in that said pressurizing surface or said supporting surface, or said pressurizing surface and said supporting surface, is or are profiled.

6. The sealing arrangement according to claim 1, characterized in that said weaker area is designed as a complete division of said sealing ring, forming two opposite sealing ring ends, in that at least one, integrally molded area extending in the circumferential direction of said sealing ring is provided on each of said sealing ring ends, and in that the areas associated with different sealing ring ends are located one behind the other in said axial direction of said sealing ring, forming a labyrinth seal, and are in contact with each other, at least in operating condition of said sealing ring.

7. The sealing arrangement according to claim 1, characterized in that said sealing ring consists of a plastic with an elongation at break at room temperature of ≦50%.

8. The sealing arrangement according to claim 1, characterized in that said sealing surface is partly or entirely arranged concentrically to said central longitudinal axis of said sealing ring, and is designed as the surface of a cylinder that can be a radially external or internal boundary surface of said ring.

9. The sealing arrangement according to claim 1, characterized in that said second gap extends at least partially over the side of said sealing ring opposite said sealing surface of said sealing ring, which forms a transitional area between said supporting surface and said pressurizing surface.

10. The sealing arrangement according to claim 1, characterized in that said sealing ring projects from said groove in said component in the radial direction by less than one-third of its radial thickness.

11. The sealing arrangement according to claim 1, characterized in that said second gap displays an essentially constant gap width over its radial extension.

12. The sealing arrangement according to claim 1, characterized in that said groove is of rounded design in the area of the groove base, or in at least one transitional area to an adjacent groove flank.

13. The sealing arrangement according to claim 1, characterized in that a first of said two components is provided, which displays said sealing ring accommodated in a circumferential groove, and in that a second of said two components is provided, which moves relative to said first of said two components and with which said sealing surface of said sealing ring can be brought into contact in sealing fashion during motion of said two components relative to each other, and in that said sealing ring is located in said groove without pretension in relation to the component to be sealed.

14. The sealing arrangement according to claim 1, characterized in that said component accommodating said sealing ring in said groove is a shaft, and in that a shaft guide is provided, with which said sealing surface of said sealing ring can be brought into contact in sealing fashion by application of the pressure of said fluid medium during rotary motion of said shaft and said shaft guide relative to each other, in that said shaft guide is made of a light metal, and in that said supporting surface of said sealing ring is inclined to said longitudinal axis of said sealing ring such that, owing to the pressure force of said fluid medium on said sealing ring, said sealing ring is located in non-rotating fashion relative to said shaft guide.

15. The sealing arrangement according to claim 1, characterized in that said component accommodating said sealing ring is a shaft guide, and in that a shaft which rotates relative to it is provided, with which said sealing surface of said sealing ring can be brought into contact in sealing fashion.

16. The sealing arrangement according to claim 1, characterized in that said two components comprise a shaft and a shaft guide.

17. The sealing arrangement according to claim 1, characterized in that said two components comprise a cylinder and a piston.

18. A sealing arrangement comprising a sealing ring having a generally triangular or trapezoidal cross-section and two components moving relative to each other, said components having a first gap width therebetween, including a radially internal or external sealing surface that can be brought into flat area contact with one of said components to form a seal against a fluid medium, where, to one side of said sealing surface, said sealing ring displays a pressurizing surface to be pressurized by said fluid medium and, on the opposite side, a supporting surface for positioning against a groove flank of one of the two components accommodating said sealing ring, wherein said pressurizing surface and said supporting surface are inclined relative to said sealing surface and enclose an angle of about 30° to 60° towards said sealing surface, and wherein said supporting surface of said sealing ring is in flat area contact with said supporting flank of said groove in any expansion or compression state of the sealing ring due to pressure changes of said fluid medium,
   wherein said supporting surface is designed as a lateral surface of a truncated cone, resulting in flat area contact with said supporting flank of said groove,
   wherein the sealing ring is divided almost completely or throughout in the radial direction at one point on its circumference, forming a weaker area,
   wherein said sealing ring is radially compressed outwards towards said radially internal sealing surface, or radially compressed inwards towards said radially external sealing surface,
   wherein one of said two components displays a groove without undercut to accommodate said sealing ring, where said groove displays a supporting flank opposite said supporting surface of said sealing ring, and a pressure-side flank opposite said pressurizing surface of said sealing ring, where said sealing surface of said sealing ring projects from said groove in the radial direction,
   wherein a second gap width is provided, at least between said pressurizing surface of said sealing ring and said pressure-side flank, into which said fluid medium to be provided on the pressure side of said sealing ring can flow, pressing said sealing ring in sealing fashion against said supporting flank of said groove and against a component to be sealed that corresponds to a first component, and, by application of pressure by said fluid medium, said supporting surface of said sealing ring over the height and circumference of the sealing ring is brought into flat area contact with said supporting flank of said groove, at least on the side facing said sealing surface, and wherein said second gap width extends over the entire lateral extension of said sealing ring,
   wherein said second gap width extends over the entire lateral extension of the sealing ring; and
   wherein said sealing surface being in sealing contact with one of said two components provides a flat sealing area and wherein said flat sealing area is provided when said supporting surface of said sealing ring is in flat area contact with said supporting flank of said groove.

19. A sealing arrangement comprising a sealing ring having a generally triangular or trapezoidal cross-section and two components moving relative to each other, said components having a first gap width therebetween, including a radially internal or external sealing surface that can be brought into contact with one of said components to form a seal against a fluid medium, where, to one side of said sealing surface, said sealing ring displays a pressurizing surface to be pressurized by said fluid medium and, on the opposite side, a supporting surface for positioning against a groove flank of one of said two components accommodating said sealing ring,
   wherein said pressurizing surface and said supporting surface are inclined relative to said sealing surface and enclose an angle of less than 90° towards said sealing surface,
   wherein said sealing ring is divided almost completely or throughout in the radial direction at one point on its circumference, forming a weaker area,
   wherein said sealing ring radially compressed outwards towards said radially internal sealing surface, or radially compressed inwards towards said radially external sealing surface,
   wherein one of said two components displays a groove without undercut to accommodate said sealing ring, where said groove displays a supporting flank opposite said supporting surface of said sealing ring, and a pressure-side flank opposite said pressurizing surface of said sealing ring, where said sealing surface of said sealing ring projects from the said groove in the radial direction,
   wherein a second gap width is provided at least between said pressurizing surface of said sealing ring and said pressure-side flank, into which said fluid medium to be provided on said pressure side of said sealing ring can flow, pressing said sealing ring in sealing fashion against said supporting flank of said groove and against one of said two components to be sealed that corresponds to the first component, and, by application of pressure by said fluid medium, said supporting surface of said sealing ring over the height and circumference of the sealing ring is brought into flat area contact with said supporting flank of said groove, at least on the side facing said sealing surface,
   wherein said groove is of concave rounded design in the central area of the groove base and in both transitional areas to both adjacent groove flanks, with a continuous transition of the concave groove base to said groove flanks, and
   wherein said transitional area of said sealing ring is arranged at said base of said groove wherein said supporting surface of said sealing ring as well as said supporting flank of said groove have an inclination angle of 30° to 60° towards said sealing surface, wherein said supporting surface is designed as a lateral surface of a truncated cone, wherein said supporting surface of said sealing ring is in flat area contact with said supporting flank of said groove in any expansion or compression state of the sealing ring due to pressure changes of said fluid medium, resulting in flat area contact with said supporting flank of said groove, and wherein said second gap width extends over the entire lateral extension of said sealing ring, and wherein said sealing surface being in sealing contact with one of said two components provides a flat sealing area and wherein said flat sealing area is provided when said supporting surface of said sealing ring is in flat area contact with said supporting flank of said groove.

20. A sealing arrangement comprising a sealing ring having a generally triangular or trapezoidal cross-section and two components moving relative to each other, said components having a first gap width therebetween, including a radially internal or external sealing surface that can be brought into flat area contact with one of said components to form a seal against a fluid medium, where, to one side of said sealing surface, said sealing ring displays a pressurizing surface to be pressurized by said fluid medium and, on the opposite side, a supporting surface for positioning against a groove flank of one of said two components accommodating said sealing ring, wherein said pressurizing surface and said supporting surface are inclined relative to said sealing surface and enclose an angle of about 30° to 60° towards said sealing surface, wherein said supporting surface is designed as a lateral surface of a truncated cone, wherein said supporting surface of said sealing ring is in flat area contact with said supporting flank of said groove in any expansion or compression state of the sealing ring due to pressure changes of said fluid medium resulting in flat area contact with said supporting flank of said groove, wherein said sealing ring is divided almost completely or throughout in the radial direction at one point on its circumference, forming a weaker area, wherein said sealing ring is radially compressed outwards towards said radially internal sealing surface, or radially compressed inwards towards said radially external sealing surface, wherein one of said two components displays a groove without undercut to accommodate said sealing ring, where said groove displays a supporting flank opposite said supporting surface of said sealing ring, and a pressure-side flank opposite said pressurizing surface of said sealing ring, and a base, where said sealing surface of said sealing ring projects from said groove in the radial direction, wherein a second gap width is provided, at least between said pressurizing surface of said sealing ring and said pressure-side flank, into which said fluid medium to be provided on said pressure side of said sealing ring can flow, pressing said sealing ring in sealing fashion against said supporting flank of said groove and against a component to be sealed that corresponds to a first component, and, by application of pressure by said fluid medium, said supporting surface of said sealing ring over the height and circumference of the sealing ring is brought into flat area contact with said supporting flank of said groove, wherein the second gap width extends over the entire lateral extension of the sealing ring, and said sealing arrangement is further characterized in that said supporting surface, forms a lateral surface and said lateral surface extends from said base of said groove up to the area of said sealing ring projecting from said groove and into said first gap width between said components, wherein said lateral surface is in flat area contact with said supporting flank of said groove when the sealing ring is pressurized when said sealing surface of said sealing ring is in flat area contact with said component;

wherein said sealing surface of said sealing ring is the surface with the greatest width referring to the cross-sectional view of said sealing ring;

wherein said flat area sealing surface of said sealing ring in the pressurized sealing position of said sealing ring is in flat area contact with the opposite component, and wherein said sealing surface being in sealing contact with one of said two components provides a flat sealing area and wherein said flat sealing area is provided when said supporting surface of said sealing ring is in flat area contact with said supporting flank of said groove.

21. A sealing arrangement consisting essentially of a sealing ring having a generally triangular or trapezoidal cross-section and two components moving relative to each other, said components having a first gap width therebetween, including a radially internal or external sealing surface that can be brought into flat area contact with at least one of said components to form a seal against a fluid medium, where, to one side of said sealing surface, said sealing ring displays a pressurizing surface to be pressurized by said fluid medium and, on the opposite side, a supporting surface for positioning against a supporting flank of the component accommodating the sealing ring, wherein one of said two components displays a groove without an undercut to receive said sealing ring, where said groove displays said supporting flank opposite said supporting surface of said sealing ring, and a pressure-side flank opposite said pressurizing surface of said sealing ring, where said sealing surface of said sealing ring projects from said groove in the radial direction, and wherein said sealing ring has a central longitudinal axis;

wherein a second gap width is provided, at least between said pressurizing surface of the sealing ring and said pressure-side flank, into which said fluid medium to be provided on the pressure side of said sealing ring can flow, pressing said sealing ring in sealing fashion against said supporting flank of said groove and against one of said two components, and, by application of pressure by said fluid medium, said supporting surface of said sealing ring over the height and circumference of the sealing ring, is brought into flat area contact with said supporting flank of said groove, wherein said supporting surface of said sealing ring as well as said supporting flank of said groove have an inclination angle of 30° to 60° towards said sealing surface, and where the cross-sectional contour of the supporting flank of the groove corresponds to the cross-sectional contour of said supporting surface of said sealing ring when said sealing surface of said sealing ring is in flat area sealing contact with said sealing surface of said component;

wherein said supporting surface is designed as a lateral surface of a truncated cone, and wherein said supporting surface of said sealing ring is in flat area contact with said supporting flank of said groove in any expansion or compression state of the sealing ring due to pressure changes of said fluid medium resulting in flat contact with said supporting flank of said groove, wherein said second gap extends over the entire lateral extension of said sealing ring, wherein said sealing ring is divided almost completely or throughout in the radial direction at one point on its circumference, forming a weaker area, wherein said sealing ring is radially compressed outwards towards said radially internal sealing surface, or radially compressed inwards towards said radially external sealing surface, wherein said sealing surface being in sealing contact with one of said two components provides a flat sealing area and wherein said flat sealing area is provided when said supporting surface of said sealing ring is in flat area contact with said supporting flank of said groove, and wherein said component accommodating said sealing ring in said groove is a shaft, in that a shaft guide is provided, with which said sealing surface of said sealing ring is brought into contact in sealing fashion by application of the pressure of said fluid medium during rotary motion of said shaft and said shaft guide relative to each other, in that said shaft guide is made of a light metal, and in that said supporting surface of said sealing ring is inclined to said longitudinal axis of said sealing ring such that, owing to the pressure force of said sealing medium on said sealing ring, said sealing ring is located in non-rotating fashion relative to said shaft guide.

* * * * *

UNITED STATES PATENT AND TRADEMARK OFFICE
CERTIFICATE OF CORRECTION

PATENT NO.         : 7,815,195 B2                                   Page 1 of 1
APPLICATION NO.    : 10/801095
DATED              : October 19, 2010
INVENTOR(S)        : Dieter Meller et al.

It is certified that error appears in the above-identified patent and that said Letters Patent is hereby corrected as shown below:

In column 14, line 37, in claim 19, after "ring" insert -- is --.

In column 14, line 67, in claim 19, delete "groove" and insert -- groove, --, therefor.

In column 16, line 53, in claim 21, delete "ring," and insert -- ring --, therefor.

Signed and Sealed this
Eleventh Day of January, 2011

David J. Kappos
*Director of the United States Patent and Trademark Office*